United States Patent
Hikmet

(10) Patent No.: US 6,406,816 B2
(45) Date of Patent: *Jun. 18, 2002

(54) POLYMERIC GEL ELECTROLYTE

(75) Inventor: Rifat A. M. Hikmet, Eindhoven (NL)

(73) Assignee: U.S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/270,439

(22) Filed: Mar. 16, 1999

(30) Foreign Application Priority Data

Mar. 23, 1998 (EP) .............................. 98200915

(51) Int. Cl.[7] .......................... H01M 10/40; H01M 2/16
(52) U.S. Cl. ....................... 429/303; 429/303
(58) Field of Search ................. 429/189, 300, 429/303

(56) References Cited

U.S. PATENT DOCUMENTS

| | | | |
|---|---|---|---|
| 4,654,279 A | 3/1987 | Bauer et al. ................ | 429/192 |
| 5,223,353 A * | 6/1993 | Ohsawa et al. ............. | 429/192 |
| 5,501,921 A * | 3/1996 | Olsen ......................... | 429/192 |

* cited by examiner

Primary Examiner—Carol Chaney
(74) Attorney, Agent, or Firm—Ernestine C. Bartlett; Norman N. Spain

(57) ABSTRACT

A multi-phase polymeric gel electrolyte for use in a rechargeable lithium battery has an ion-conductivity of more than 1 mS/cm and comprises a continuous ion-conductive liquid phase interpenetrating a solid phase. The solid phase which is obtained by polymerizing alkane monomers has a microscopic network structure which is selected such that when the electrolyte is employed in a rechargeable lithium metal battery, the battery is capable of being fully charged and discharged at a 0.2 C rate more than 20 times without short-circuiting due to dendritic growth. Suitable microscopic network structures are obtained using polydecandioldiacrylates. A method of preparing said electrolytes involves polymerizing a one-phase polymerizable composition which undergoes 1a phase separation during polymerization.

8 Claims, 3 Drawing Sheets

POLYMERIC GEL ELECTROLYTE

BACKGROUND OF THE INVENTION

The invention relates to a polymeric gel electrolyte.

The invention further relates to a method of preparing such an polymeric gel electrolyte.

The invention still further relates to a rechargeable lithium battery comprising such a polymeric gel electrolyte.

Due to its small size and weight, high energy density and high voltage, a battery having a lithium-based anode, or lithium battery for short, is an attractive source of electric energy for portable and/or hand-held electr(on)ic equipment in particular. Such a battery comprises a lithium-based anode, a cathode, and disposed therebetween, an electrolyte.

In the case of primary lithium batteries, a highly ion-conductive liquid electrolyte can be suitably used. However, when employed in a rechargeable (also referred to as secondary) lithium battery such a liquid electrolyte gives, upon charging, rise to dendritic growth which in turn leads to short-circuits. Dendritic growth is less when a solid electrolyte is used. However, the ion-conductivity of a solid electrolyte is insufficient for many practical purposes such as when a battery is to be rapidly (dis)charged. In an attempt to combine liquid and solid electrolytes in an advantageous manner, the use of polymeric gel electrolytes, i.e. a polymer which is gelled by means of an ion-conductive liquid, has been proposed.

In this respect, reference is made to U.S. Pat. No. 5,501, 921 which discloses polymeric gel electrolytes comprising a cross-linked polymer and an ion-conductive liquid. The cross-linked polymer is obtained by cross-linking functionalized alkane monomers each having 2 to 100 carbon atoms and each having at least one polymerizable functional group. The total number of polymerizable functional groups is selected such that the polymer electrolyte is substantially chemically inert when brought into contact with a lithium anode.

In practice it may happen that when such a known polymeric gel electrolyte is employed in a rechargeable battery and the battery is repeatedly charged and subsequently discharged, for example at a 0.2 C rate (a y C rate means that the battery is (dis)charged to its full capacity in $y^{-1}h$), said battery short-circuits after a small number of repetitions. Inspection of the short-circuited battery shows that dendrites have grown through the polymeric gel electrolyte.

SUMMARY OF THE INVENTION

It is an object of the invention to provide novel polymeric gel electrolytes which do not have the abovementioned disadvantages, or at least to a lesser extent. When employed in a rechargeable lithium battery, the polymeric gel electrolyte should have a high ion-conductivity, should not react with the lithium anode and should effectively suppress the dendritic growth which leads to short-circuits when the battery is repeatedly charged and discharged.

This object is achieved by a multi-phase polymeric gel electrolyte having an ion-conductivity of more than 1 mS/cm and comprising:

(a) a continuous solid phase predominantly comprising a polymer obtainable by polymerizing functionalized $C_2-C_{100}$ alkane monomers or alkylene oxide monomers having the formula $\{(CH_2)_p-O\}_{m(II)}$ wherein m=2, 3 or 4 and p=3, 4, 5 or 6 formule (II) each functionalized with at least one polymerizable group, and (b) a continuous liquid phase interpenetrating said solid phase and predominantly comprising an ion-conductive liquid containing a solvent and a lithium salt at least partly dissolved therein, wherein said solid phase has a microscopic network structure which is selected such that when a rechargeable battery is formed by disposing said multi-phase polymeric gel electrolyte between a lithium metal anode and a lithium cobaltate cathode said rechargeable battery has a capacity per unit surface area of at least 3 $mAh/cm^2$ and is capable of being fully charged and discharged at least 20 times at a 0.2 C rate without short-circuiting.

The extent to which a polymeric gel electrolyte suppresses dendritic growth is measured by repeatedly fully charging and discharging a rechargeable lithium battery having a capacity per unit surface area of at least 3 $mAh/cm^2$ and comprising said polymeric gel electrolyte disposed between a lithium metal anode and a lithium cobaltate cathode. If the said battery can be fully charged and discharged at least 20 times at at least a 0.2 C rate without short-circuiting, the solid phase of the polymeric gel electrolyte has a suitable microscopic network structure and the suppression of dendritic growth is considered to be effective.

Surprisingly, it is found that the ability of a polymeric gel electrolyte to suppress dendritic growth when employed in a rechargeable battery is significantly improved if a multi-phase polymeric gel electrolyte is employed in which the polymer, being part of a solid phase, and the ion-conductive liquid, being part of a continuous liquid phase, interpenetrate on a microscopic scale. After all, one would expect dendritic growth to be minimal if a one-phase polymeric gel electrolyte in which the polymer and the liquid interpenetrate on a molecular scale is employed. However, contrary to this expectation, suppression of dendritic growth is found to be most effective if the (polymer of the) solid phase is selected such that it has a microscopic network structure of a particular morphology.

As a typical example, polymerizing a composition composed of 40 wt. % decanedioldiacrylate and 60 wt. % 1 M $LiPF_6$ in a 1:1 (v/v) mixture of ethylenecarbonate and diethylcarbonate produces a multi-phase polymeric gel electrolyte having an ion-conductivity of 1.2 mS/cm which, when employed in a lithium metal battery, allows said battery to be fully charged and subsequently discharged more than 40 times at a 0.2 C rate without short-circuiting.

The invention is based on the recognition that the occurrence of dendritic growth leading to short-circuits is related to a degradation of the polymeric gel electrolyte. The degradation is due to a reaction between (neutral) lithium and the polymer occurring at the interface between polymer and liquid. By providing a multi-phase polymeric gel electrolyte in which the polymer is phase-separated from the ion-conductive liquid on a microscopic scale the surface area of the interface and, consequently, the rate at which the degradation reaction occurs is reduced.

The continuous solid phase of the multi-phase polymeric gel electrolyte in accordance with the invention has a microscopic network structure. It extends throughout the entire polymeric gel electrolyte in all directions thus giving the polymeric gel electrolyte a mechanical support similar to that obtained for a one-phase polymeric gel electrolyte.

It is emphasized that, in the context of the invention, the term network structure refers to a network of microscopic dimensions and not to the network of covalently bonded atoms of a cross-linked polymer.

As already mentioned above, the morphology of the microscopic network structure of the solid phase is an essential parameter with respect to the suppression of dendritic growth leading to short circuits because it determines the morphology of the liquid phase which is the complement to that of the solid phase.

Although it is not to be interpreted as limiting the scope of the invention, electron micrographs taken of the surfaces of films of multi-phase polymeric gel electrolytes show that a suitable network structure is one which is composed of more or less spherical particles having a characteristic diameter of 0.1 to 0.5 $\mu$m. On the other hand, network structures of spherical particles having a characteristic diameter of 0.5 $\mu$m to 1.0 $\mu$m or larger have by and large been found unsuitable. Obviously, apart from the size of the particles there should be a sufficient number of them. That is the network structure is to be sufficiently dense. The density of the microscopic network may be simply increased by increasing the weight ratio of solid to liquid phase.

As is well known to those skilled in the art, there are many parameters which influence the morphology of a multi-phase material. Examples of such parameters in the context of the present invention include, but are not limited to, the polymer, the ion-conductive liquid and the relative amounts in which these components are used. Another parameter, one which is independent of the composition of the polymeric gel electrolyte, is the method of preparing the polymeric gel electrolyte.

The liquid phase interpenetrates the solid phase. Because it is continuous, the lithium ions present therein are able to move throughout the polymeric gel electrolyte.

The considerations regarding the weight ratio of polymer (solid phase) to ion-conductive liquid (liquid phase) in a multi-phase polymeric gel electrolyte are basically the same as those in the case of a one-phase polymeric gel electrolyte. The desired ion-conductivity (higher at larger weight ratios) is to be balanced against the desired mechanical strength (higher at smaller weight ratios).

In accordance with U.S. Pat. No. 5,501,921, $C_2$–$C_{100}$ alkane monomers are employed so as to avoid a chemical reaction between the lithium anode and the polymer. The functionalized alkane monomers may form a polydisperse or monodisperse composition. They may each be branched or unbranched, and, if desired, functionalized with a small number of other groups. For example, a —$CH_2$— unit may occasionally (not more than once per 5 carbon atoms of the alkane monomers in order to minimize reactivity with respect to lithium) be replaced by an —O— unit or an amylene unit such as phenylene, naphtphylene, biphenylene, and 4,4'-isopropylidenediphenyl.

The alkane monomers are each at least functionalized with one polymerisable group. Suitable polymerisable groups include isocyanate, epoxy groups or ethylenically unsaturated groups such as vinyloxy, acrylyl, methacrylyl or styryl groups. Preferred are methacrylyl or acrylyl groups. The thiolene system is also suitable.

The liquid phase predominantly comprises an ion-conductive liquid. Since the electrolyte is to be used in a lithium battery, a lithium salt is used which is dissolved in a solvent.

Lithium salts known per se are suitable and include LiBr, LiSCN, LiI, LiCl, $LiClO_4$, $LiBF_4$, $LiAsF_6$, $LiCF_3COO$, $LiCF_3SO_3$, and $LiPF_6$.

Solvents which are non-aqueous, aprotic and polar can be suitably used and include solvents known per se such as 1,3-dioxalane, 2-methyltetrahydrofiran, $\gamma$-butyrolactone, N-methylpyrrolidone, N,N-dimethylformamide, N,N-dimethylacetamide, dimethylsulfoxide, and, in particular carbonates such as diethylcarbonate, dimethylcarbonate, ethylenecarbonate and propylenecarbonate or mixtures thereof.

The lithium salt concentration is preferably as large as possible since this will lead to a higher ion-conductivity. However, if the solubility limit is exceeded the ion-conductivity does not increase anymore. A suitable weight ratio of lithium salt to solvent is 0.6 to 1.0.

The multi-phase polymeric gel electrolyte can be moulded into any shape such as a layer, provided on a substrate or prepared as a self-supporting film. When employed in a rechargeable lithium battery, the layer thickness is suitably selected between 5–200 $\mu$m, but is preferably between 25–100 $\mu$m, or better still between 30–60 $\mu$m.

U.S. Pat. No. 4,654,279 discloses a solid polymer electrolyte comprising an interpenetrating network of two co-continuous phases, one of these phases being a cross-linked polymer providing a mechanical support matrix, the other being an ion-conductive phase comprising a metal salt and a salt complexing liquid polymer. However, the polymers disclosed therein are not obtained from functionalized $C_2$–$C_{100}$ alkane monomers as a result of which, in accordance with U.S. Pat. No. 5,501,921, the polymer electrolytes disclosed in U.S. Pat. No. 4,654,279 are not chemically inert with respect to lithium. The ion-conductivity of the electrolytes disclosed therein is significantly lower than that of the electrolytes in accordance with the present invention. Also, U.S. Pat. No. 4,654,279 is completely silent on the problem of dendritic growth, let alone on solutions which may alleviate said problem. Furthermore, a rechargeable lithium battery is not explicitly disclosed.

In a particular embodiment of the multi-phase polymeric gel electrolyte in accordance with the invention, the polymer is a cross-linked polymer. In the context of the invention, cross-linked is understood to mean chemically cross-linked by means of chemical bonds as opposed to physically cross-linked due to entanglement of polymer chains. A cross-linked polymer provides excellent mechanical strength across a wide range of temperatures and for extended periods of time. A film made thereof is sufficiently flexible and compressible to take up changes in shape of the anode or cathode of a battery which may occur as a result of (dis)charging. A cross-linked polymer is obtainable by polymerizing monomers of which at least a certain number is provided with more than one polymerizable group. Suitable cross-linked polymers include cross-linked epoxides, polyurethanes, poly(meth)acrylates, polystyrenes, and polyacrylonitriles.

Preferably, cross-linked poly(meth)acrylates are used which may be obtained by radiation-polymerizing corresponding (meth)acrylate monomers. Electron and gamma radiation are suitable and have the advantage that they do not require an initiator compound. However, photopolymerisation using UV radiation in combination with an UV-sensitive initiator compound, examples of which are well known to those skilled in the art, are preferred. In order to obtain an electrolyte comprising a solid phase having a suitable microscopic network structure, the use of cross-linked polyacrylates and in particular polydiacrylates is preferred.

In accordance with a preferred embodiment of the invention, the multi-phase polymeric gel electrolyte comprises 30 to 65 wt. % of a polymer obtainable by polymerizing alkane monomers represented by the formula (I)

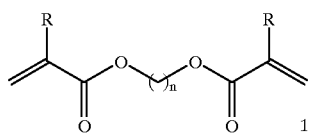

(I)

wherein n=8, 10 or 12 and R=H. When combined with conventional ion-conductive liquids, said polymers are capable of forming a multi-phase polymeric gel electrolyte comprising a solid phase having a microscopic network structure of a suitable morphology. If said alkane monomers are employed in the method in accordance with the invention described hereinbelow, a microscopic network structure in accordance with the invention is obtained.

The inventor has observed that at least if the polymeric gel electrolyte of this preferred embodiment is used, the limiting factor with respect to service life of the battery in which said electrolyte is employed is the cycling efficiency. Since the cycling efficiency is not 100 %, a part of the lithium anode is sacrificed during each discharge and the battery ceases to be operative if all the lithium of the anode is sacrificed. Since this happens before the battery short-circuits, the operation of the battery is inherently safe.

Preferably, the ion-conductive liquid is a lithium salt dissolved in an alkane carbonate such as a mixture of diethylcarbonate and ethylenecarbonate.

The invention further relates to a method of preparing a multi-phase polymeric gel electrolyte in accordance with the invention. The method comprises the steps of:

(1) providing a one-phase polymerizable composition comprising:
  (a) functionalized $C_2$–$C_{100}$ alkane monomers or alkylene oxide monomers having the formula $\{(CH_2)_p-O\}_{m(II)}$, wherein m=2, 3 or 4 and p=3, 4, 5 or 6 each functionalized with at least one polymerizable group, and
  (b) an ion-conductive liquid containing a solvent and a lithium salt at least partly dissolved therein, the alkane monomers being selected such that said one-phase polymerizable composition undergoes a phase separation during polymerization thereof, (2) polymerizing said one-phase polymerizable composition, thereby forming the multi-phase polymeric gel electrolyte in accordance with the invention.

The method renders the multi-phase polymeric gel electrolyte readily processible even when, and in particular if, the polymer used is a cross-linked polymer.

The one-phase polymerizable composition may be formulated as a liquid or paste which may be processed by means of conventional printing and coating techniques thus allowing, for example, self-supporting films and thin coatings to be routinely made.

During polymerisation the composition undergoes phase separations. Phase separation is brought about by selecting alkane monomers which are miscible with the liquid in the monomeric state but not in the (pre)-polymeric state. In the art this is known as reaction induced phase decomposition. In order to arrive at a suitable microscopic network structure, a phase decomposition of the spinodal type is preferred. Examples of suitable alkane monomers and polymerizable groups have already been described hereinabove. The conditions under which the polymerization is to be carried out depend on the particular polymerizable group used and are well known to those skilled in the art.

The invention still further relates to a rechargeable lithium battery comprising a multi-phase polymeric gel electrolyte in accordance with the invention. Embodiments of suitable polymeric gel electrolytes and methods of manufacturing such suitable electrolytes are described hereinabove.

Cathodes of a conventional type which include oxidic compounds capable of intercalating and deintercalating lithium may be suitably used. Preferred cathodic materials are $LiCoO_2$, i.e. lithium cobaltate, $LiNiO_2$, $LiMn_2O_4$ and $Li_xMnO_2(0<x<0.5)$.

Suitable anodic materials are of a conventional type and include lithium alloys such as Li:Al, Li:Hg, Li:Pb, Li:Sn and Wood's alloys, and composite materials of lithium and a carbon compound such as polyacetylene or graphite. Because of its high energy density lithium metal is preferred.

The battery (cell) may be of the cylindrical type, the sheet type, the button type or any other suitable conventional type.

EXAMPLE 1

(In Accordance with the Invention)
Preparation of Polymeric Gel Electrolyte

A one-phase optically transparent polymerizable composition is prepared by mixing:

40 wt. % decandioldiacrylate (formula (I), R=H, n=10) commercially available from Polysciences and obtainable by condensating decandiol and acrylic acid,

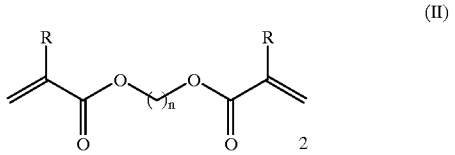

(II)

59.5 wt. % of 1 M $LiPF_6$ in a 1:1 (v/v) mixture of ethylenecarbonate and diethylcarbonate.

0.5 wt. % of the photo-initiator α,α-dimethoxydeoxybenzoin (Irgacure 651, Ciba Geigy).

A quantity of said composition is applied between two glass plates, spread so as to form a film, and subsequently irradiated with UV light originating from a 1 mW/cm² TL lamp for 15 min, thereby forming a 100 μm thick film of a polymeric gel electrolyte. During polymerisation said composition becomes turbid and light-scattering, indicating that the composition undergoes a phase separation (spinodal phase decomposition) so as to form a multi-phase polymeric gel electrolyte. The polymer of the electrolyte is a cross-linked poly(decandioldiacrylate). After removing the glass plates a flexible, self-supporting and light-scattering foil of multi-phase polymeric gel electrolyte in accordance with the invention is obtained.

The ion-conductivity at 20° C. is $2.5 \times 10^{-3}$ S/cm as determined by complex impedance spectroscopy.

Rechargeable Battery

Figure 1:
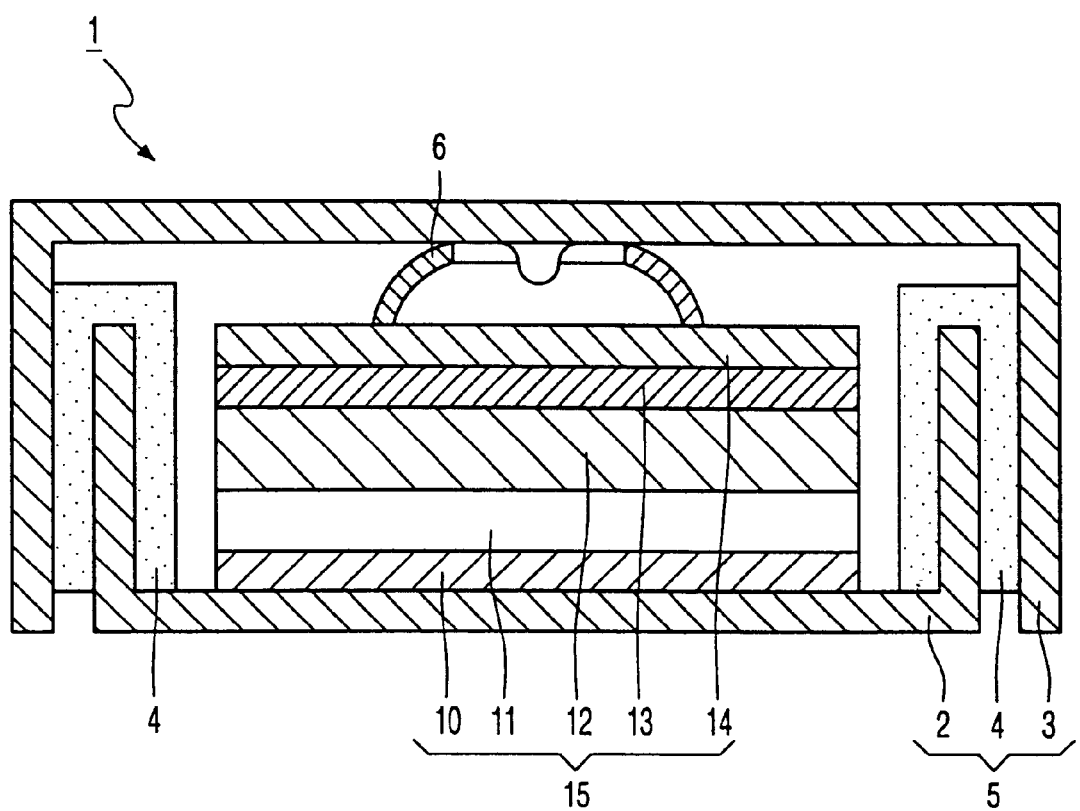
FIG. 1 shows, schematically, a cross-sectional view of a rechargeable lithium battery.

FIG. 1 shows, schematically, a cross-sectional view of a rechargeable lithium battery of the button-cell type indicated by the reference sign 1. It is of a conventional design and comprises a laminate 15 of a lithium-based anode 10, a polymeric gel electrolyte 11, a lithium cobaltate cathode 12, a current collector 13 and a stainless steel plate 14. The laminate 15 is hermetically sealed from the environment by means of a housing 5 comprising an inner dish 2 and an outer dish 3, the inner and outer dish being electrically insulated from each other by means of the gasket 4. The laminate 15 is situated in the housing 5 under pressure, the pressure being provided by the metal dish spring washer 6.

An embodiment of the button-cell 1 in accordance with the invention is manufactured as follows:

The laminate 15 is manufactured by successively stacking the appropriate foils one on top of the other:

a) a 200 μm thick circular lithium metal foil 10 having a diameter of 14.8 mm, b) a 100 μm thick circular polymeric gel electrolyte foil 11 having a diameter of 16.8 mm, the polymeric gel electrolyte foil being the one obtained above, c) a circular $Li_{1-x}CoO_2$ cathode foil 12 (x=0.55) having a diameter of 13.8 mm (surface area 1.5 cm$^2$) carried by a 10 μm thick aluminum current collector 13 as obtainable from Matsushita battery Industries. The capacity per unit weight of this cathode material is 126 mAh/g and the capacity per unit surface area is 3.0 mAh/cm$^2$.

d) a 100 μm thick stainless steel circular plate 14.

The laminate 15, inner dish 2, outer dish 3 and spring dish washer 6 (stiffness 1 kg) are subsequently assembled in a conventional manner so as to form the button-cell 1. The capacity of the button-cell 1 is 4.5 mAh.

Figure 2:
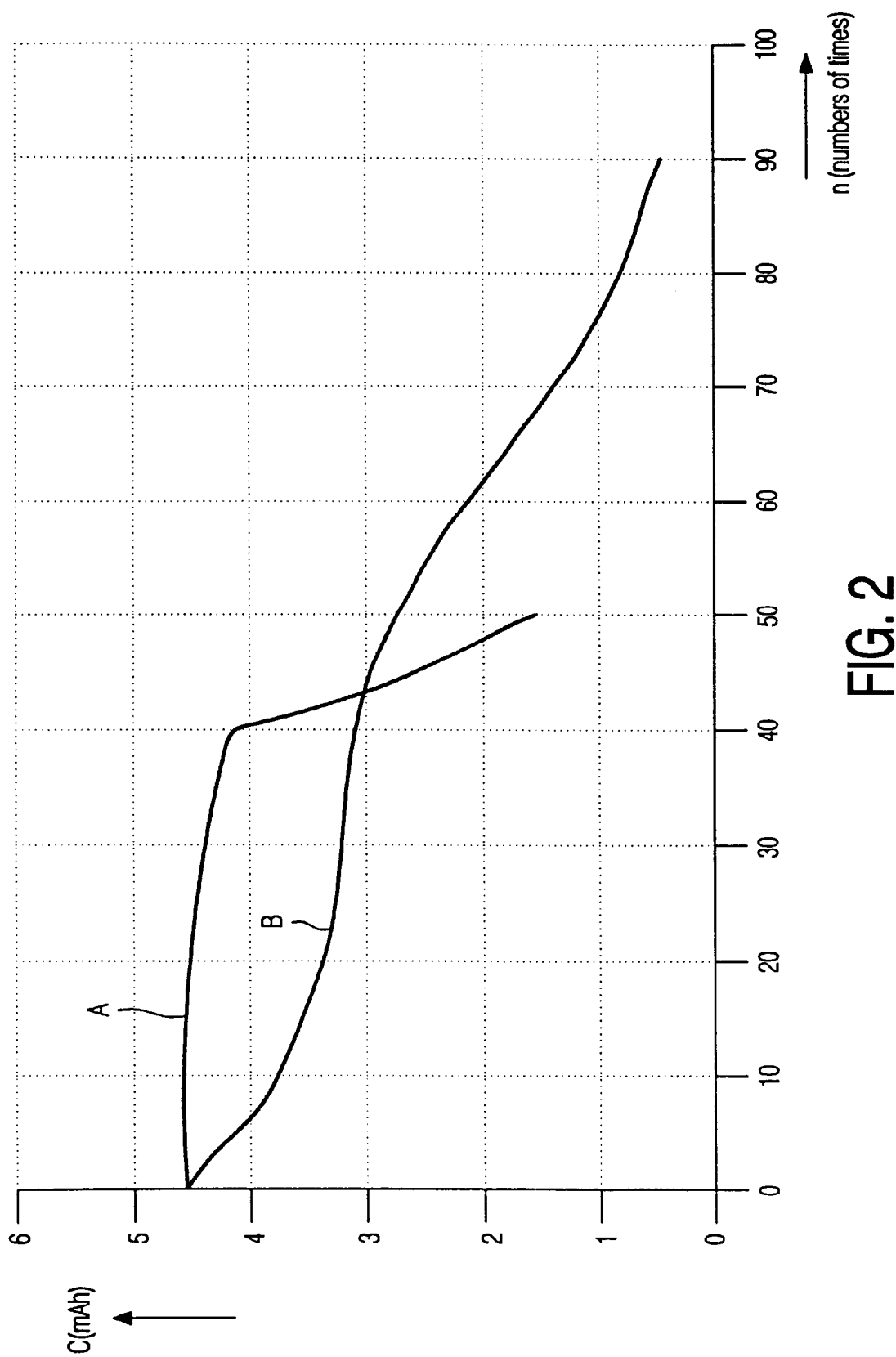
FIG. 2 shows the capacity C (in mAh) as a function of the number of charge/discharge cycles n (in number of times) of a rechargeable lithium battery in accordance with the invention.

The curve labelled A in FIG. 2 shows the capacity C (in mAh) as a function of the number of charge/discharge cycles n (in number of times) of the rechargeable lithium battery 1 of the present example. The charging current is 1.0 mA, the charging cut-off voltage is 4.15 V and the rate of charging is 0.2 C. The discharging current is 1.0 mA, the discharging cut-off voltage is 3.2 V. After every charge and discharge cycle the battery is allowed to rest for 15 min.

The curve A of FIG. 2 demonstrates that the battery can be fully charged and discharged at least 40 times without short-circuiting. After 40 cycles the capacity of the battery decreases because the surplus lithium provided by the lithium anode 10 is exhausted, indicating that the service life of the battery is determined by the cycling efficiency. Since within its service life short-circuits are not observed, the operation of the battery is inherently safe. If after 50 cycles the battery is taken apart and the polymeric gel electrolyte inspected, substantial dendritic growth is not observed.

If the lithium metal anode is replaced by a composite carbon lithium anode supported by a copper current collector, the number of charge/discharge cycles is even higher, namely at least 80.

Dynamical Mechanical Thermal Analysis (DMTA)

Figure 3:
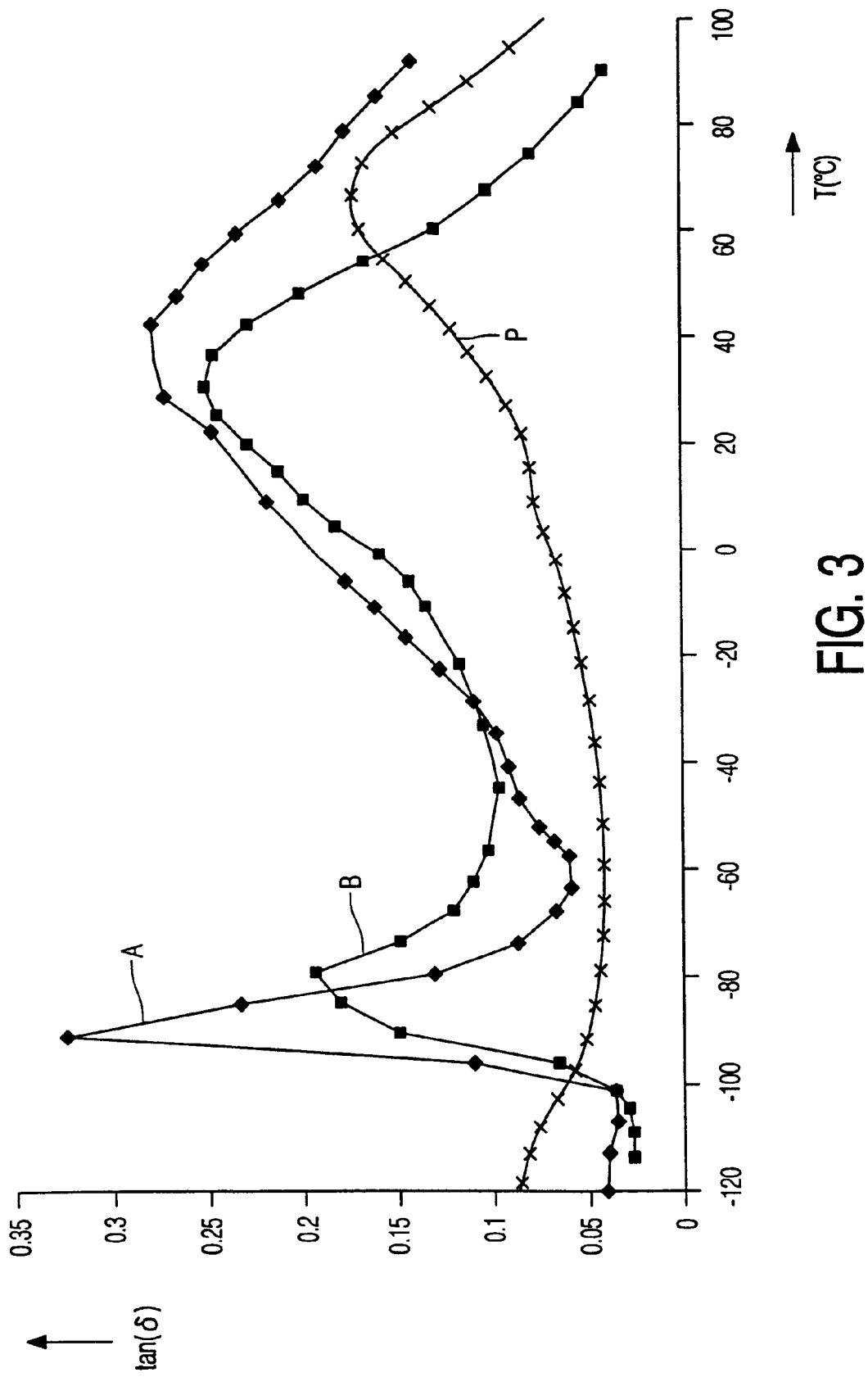
FIG. 3 shows the loss tangent tan(δ) (in dimensionless units) as a function of the temperature T (in °C.) of a multi-phase polymeric gel electrolyte.

FIG. 3 shows the loss tangent tan(δ) (in dimensionless units) as a function of the temperature T (in ° C.) for a number of multi-phase polymeric gel electrolytes. The curve labelled A corresponds to the polymeric gel electrolyte of the present example. Two well-separated peaks are observed, which demonstrates that a multi-phase polymeric gel electrolyte is obtained. In contrast, the curve labelled P, which corresponds to a sample consisting of pure cross-linked polymer exhibits, as expected, only one peak.

Morphology of the Microscopic Network

An electron micrograph (magnification factor of 4000) taken of the surface of the film shows a random pattern of bright areas on a continuous dark background characteristic of a multi-phase polymeric gel electrolyte which is phase-separated on a microscopic scale. The bright areas, which correspond to parts of the microscopic network of the solid phase of the polymeric gel electrolyte, are more or less spherical with a characteristic diameter of 0.1 to 0.5 μm. The continuous dark background corresponds to a continuous liquid phase which interpenetrates the solid phase.

The performance of the rechargeable lithium battery 1 of the present example demonstrates that the morphology observed in the electron micrograph is that of a microscopic network structure selected in accordance with the invention.

EXAMPLE 2
(In Accordance with the Invention)

EXAMPLE 1 is repeated with this difference that the one-phase polymerizable composition is composed of:

50 wt. % decandioldiacrylate (formula (I), R=H, n=10) commercially available from Polysciences and obtainable by condensating decandiol and acrylic acid,

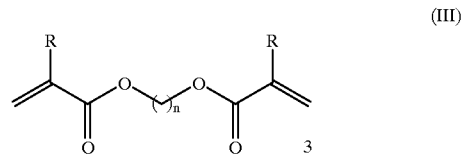

(III)

49.5 wt. % of 1 M $LiPF_6$ in a 1:1 (v/v) mixture of ethylenecarbonate and diethylcarbonate.

0.5 wt. % of the photo-initiator α,α-dimethoxydeoxybenzoin (Irgacure 651, Ciba Geigy).

A 100 μm thick film of a polymeric gel electrolyte obtained by polymerizing said polymerizable composition is flexible, self-supporting, turbid and light-scattering. The ion-conductivity at 20° C. of the film is $1.1 \times 10^{-3}$ S/cm as determined by complex impedance spectroscopy.

Rechargeable Battery

An embodiment of the button-cell 1 having a capacity of 4.5 mAh and comprising the polymeric gel electrolyte of the present example is manufactured and subsequently cycled in accordance with the method of EXAMPLE 1.

The curve labelled B in FIG. 2 shows the capacity C (in mAh) as a function of the number of charge/discharge cycles n (in number of times) of the rechargeable lithium battery 1 of the present example. The charging current is 1.0 mA, the charging cut-off voltage is 4.15 V and the rate of charging is 0.2 C. The discharging current is 1.0 mA, the discharging cut-off voltage is 3.2 V. After every charge and discharge cycle the battery is allowed to rest for 15 min.

The curve B of FIG. 2 demonstrates that the battery can be fully charged and discharged at least 90 times without short-circuiting. The service life of the battery is determined by the cycling efficiency. Within this service life, the battery does not short-circuit. If after 90 cycles the battery is taken apart and the polymeric gel electrolyte inspected, substantial dendritic growth is not observed.

Dynamical Mechanical Thermal Analysis (DMTA)

FIG. 3 shows the loss tangent tan(δ) (in dimensionless units) as a function of the temperature T (in ° C.) for a number of multi-phase polymeric gel electrolytes. The curve labelled B corresponds to the polymeric gel electrolyte of the example 2. Two well-separated peaks are observed, which demonstrates that a multi-phase polymeric gel electrolyte is obtained. In contrast, the curve labelled P, which corresponds to a sample consisting of pure cross-linked polymer exhibits, as expected, only one peak.

Morphology of the Microscopic Network

An electron micrograph (magnification factor of 4000) taken of the surface of the film shows a solid phase of more or less spherical particles having a characteristic diameter of about 0.05–0.3 μm. Strands of particles having a length of, typically, a few micrometers are clearly observed. The strands are more or less straight and mutually parallel.

The performance of the lithium battery demonstrates that the morphology shown in the electron micrograph corresponds to that of a microscopic network structure which is selected such that a multi-phase polymeric gel electrolyte in accordance with the invention is obtained.

Further results in accordance with the invention are obtained if the weight percentage of decandioldiacrylate is 30 or 65 wt. %. Also, similar results are obtained if use is made of 30–65 wt. % octanedioldicarylate (formula (I), n=8, R=H) or dodecanedioldiacrylate (formula (I), n=12, R=H).

EXAMPLE 3
(Not in Accordance with the Invention)

Example 1 is repeated with this difference that the one-phase polymerizable composition is composed of:

40 wt. % decandioldimethacrylate (formula (I), R=CH$_3$, n=10) commercially available from Polysciences and obtainable by condensating decandiol and methacrylic acid, 59.5 wt. % of 1 M LiPF$_6$ in a 1:1 (v/v) mixture of ethylenecarbonate and diethylcarbonate.

0.5 wt. % of the photo-initiator α,α-dimethoxydeoxybenzoin (Irgacure 651, Ciba Geigy).

The composition is a one-phase, optically transparent mixture. During polymerisation, the composition undergoes phase separation (spinodal phase decomposition) so as to form a multi-phase polymeric gel electrolyte. At 20° C., the ion-conductivity is 1.4 mS/cm. A 100 μm thick film is flexible, light-scattering and self-supporting.

Rechargeable Battery

An embodiment of the button-cell 1 having a capacity of 4.5 mAh and comprising the polymeric gel electrolyte of the present example is manufactured and subsequently cycled in accordance with the method of example 1.

During charging at a 0.2 C rate, the battery voltage is found to change erratically about a value of 3.95 V which is indicative of short-circuiting. As a result the battery cannot be charged to its full capacity. The battery is then taken apart so as to allow inspection of the polymeric gel electrolyte, said inspection revealing severe dendritic growth. The dendrites cause the battery to short-circuit.

Dynamical Mechanical Thermal Analysis (MTA)

Two well-separated peaks at about –90 and 0° C. are observed indicating that the polymeric gel electrolyte of the present example is a multi-phase polymeric gel electrolyte.

Morphology of the Microscopic Network

An electron micrograph (magnification factor of 4000) taken of the surface of the film prepared above shows a solid phase of more or less spherical particles having a characteristic diameter of about 0.5–5.0 μm.

The performance of the lithium battery demonstrates that the microscopic network structure shown in the electron micrograph does not have a suitable morphology. The particles are too large to suppress dendritic growth effectively. Consequently, the multi-phase polymeric gel electrolyte of the present example is not in accordance with the invention.

The electrolytic properties of the polydecandiolnethacrylate-containing electrolyte of the present example are quite different from those of the polydecandiolacrylate-containing electrolyte of EXAMPLE 1. This is contrary to the above-mentioned U.S. Pat. No. 5,501,921 which teaches that these electrolytes are equivalent.

Essentially the same result is obtained if the polymerizable composition comprises 25 wt. % decandioldiacrylate. If use is made of a composition comprising 60 or 80 wt. % of decandioldimethacrylate the ion-conductivity of the corresponding polymeric gel electrolyte, $0.14 \times 10^{-3}$ and $8 \times 10^{-8}$ S/cm respectively, is significantly lower than 1 mS/cm rendering these electrolytes unsuitable in the context of the present invention.

EXAMPLE 4
(Not in Accordance with the Invention)

EXAMPLE 1 is repeated with this difference that the one-phase polymerizable composition is composed of:

20 wt. % polyethyleneglycoldiacrylate monomer (M$_w$= 400) commercially available from Aldrich, 79.5 wt. % of 1 M LiPF$_6$ in a 1:1 (v/v) mixture of ethylenecarbonate and diethylcarbonate.

0.5 wt. % of the photo-initiator α,α-dimethoxydeoxybenzoin (Irgacure 651, Ciba Geigy).

The one-phase polymerizable composition is optically transparent. By means of photo-polymerisation between glass plates a 100 μm thick film of a polymeric gel electrolyte comprising a cross-linked poly (polyethyleneglycoldiacrylate) is obtained. During the polymerisation, the composition being polymerized remains optically transparent, indicating that a one-phase polymeric gel electrolyte is formed. At 20° C., the ion-conductivity of the film is about 1.5 mS/cm.

Rechargeable Battery

An embodiment of the button-cell 1 having a capacity of 4.5 mAh and comprising the polymeric gel electrolyte of the present example is manufactured and subsequently cycled in accordance with the method of example 1.

During charging at a 0.2 C rate, the battery voltage is found to change erratically about a value of 3.95 V which is indicative of short-circuiting. As a result the battery cannot be charged to its full capacity. The battery is then taken apart so as to allow visual inspection of the polymeric gel electrolyte. Severe dendritic growth is observed confirming that the short-circuits are caused by dendritic growth.

Dynamical Mechanical Thermal Analysis (DMTA)

The loss tangent tan(δ) (in dimensionless units) plotted as a function of the temperature T (in ° C.) of the polymeric gel electrolyte of the present example results in a graph which shows one maximum only at about –80° C. This demonstrates that the polymeric gel electrolyte of the present example is one-phase.

Morphology of the Microscopic Network

An electron micrograph (magnification factor of 4000) of the surface of the film prepared above shows a homogeneous image indicating that the polymeric gel electrolyte of the present example is a one-phase polymeric gel electrolyte. The polymer and the ion-conductive liquid do not interpenetrate on a microscopic scale but on a molecular scale.

Similarly unsuitable one-phase polymeric gel electrolytes are obtained if the weight percentage of polyethyleneglycoldiacrylate is 40, 60 or 80 wt. %.

EXAMPLE 5
(In Accordance with the Invention)

EXAMPLE 1 is repeated with this difference that the one-phase polymerizable composition is composed of:

40 wt. % butylene oxide diacrylate (formula (II), m=2, p=4), 59.5 wt. % of 8.2 % LiClO$_4$ in propylene carbonate, 0.5 wt. % of the photoinitiator of EXAMPLE 1.

A 100 μm thick of a polymeric gel electrolyte obtained by polymerizing said polymerizable composition is flexible, self-supporting, turbid and light-scattering, indicating that the composition undergoes a phase separation so as to form a multi-phase polymeric gel electrolyte. The ion-conductivity at 20° C. of the film is $3\times10^{-3}$ S/cm as determined by complex impedance spectroscopy.

DMTA shows two well-separated peaks at about −100° C. and −20° C., which demonstrates that a multi-phase polymeric gel electrolyte is obtained.

What is claimed is:

1. A multi-phase polymeric gel electrolyte having an ion-conductivity of more than 1 mS/cm and comprising:
    (a) a continuous solid phase predominantly comprising a polymer obtainable by polymerizing functionalized $C_2$–$C_{100}$ alkane monomers or alkylene oxide monomers having the formula $\{(CH_2)_p-O\}_{m(II)}$ wherein m=2, 3 or 4 and p=3, 4, 5 or 6 each functionalized with at least one polymerizable group, and
    (b) a continuous liquid phase interpenetrating said solid phase and predominantly comprising an ion-conductive liquid containing a solvent and a lithium salt at least partly dissolved therein, wherein said solid phase has a microscopic network structure formed of spherical microscopic particles having diameter of about 0.05–0.5 μm. which is selected such that when a rechargeable battery is formed by disposing said multi-phase polymeric gel electrolyte between a lithium metal anode and a lithium cobaltate cathode said rechargeable battery has a capacity per unit surface area of at least 3 mAh/cm$^2$ and is capable of being fully charged and discharged at least 20 times at a 0.2 C rate without short-circuiting.

2. A multi-phase polymeric gel electrolyte as claimed in claim 1, wherein the polymer is a cross-linked polymer.

3. A multi-phase polymeric gel electrolyte as claimed in claim 1, wherein the polymer is a polyacrylate.

4. A multi-phase polymeric gel electrolyte as claimed in claim 3 comprising 30 to 65 wt. % of a polymer obtainable by polymerizing alkane monomers represented by the formula (I)

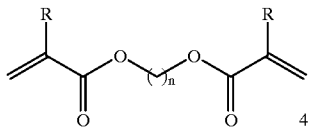

(I)

wherein n=8, 10 or 12 (and R=H).

5. A multi-phase polymeric gel electrolyte as claimed in claim 4 comprising 30 to 65 wt. % of an ion-conductive liquid consisting substantially of an equimolar mixture of ethylenecarbonate and diethylcarbonate and a lithium salt dissolved therein.

6. A method of preparing a multi-phase polymeric gel electrolyte as claimed in claim 1 comprising the steps of:
    (1) providing a one-phase polymerizable composition comprising:
        (a) functionalized $C_2$–$C_{100}$ alkane monomers or alkylene oxide monomers having the formula $\{(CH_2)_p-O\}_{m(II)}$ wherein m=2, 3 or 4 and p=3, 4, 5 or 6 each functionalized with at least one polymerizable group, and
        (b) an ion-conductive liquid containing a solvent and an lithium salt at least partly dissolved therein,
        the alkane monomers being selected such that said one-phase polymerizable composition undergoes a phase separation during polymerization thereof,
    (2) polymerizing said one-phase polymerizable composition, thereby forming the multi-phase polymeric gel electrolyte.

7. A rechargeable lithium battery comprising a polymeric gel electrolyte disposed between an anode and a cathode, characterized in that the polymeric gel electrolyte is a multi-phase polymeric gel electrolyte as claimed in claim 1.

8. A rechargeable battery as claimed in claim 7, characterized in that the anode is a lithium metal anode.

* * * * *